Nov. 16, 1965    F. G. DONOFRIO    3,217,476
COTTON PICKING SPINDLE
Original Filed July 5, 1962
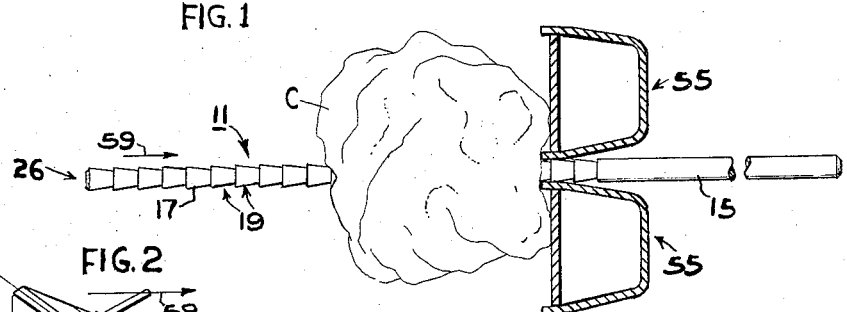
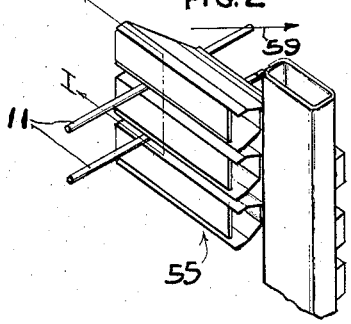
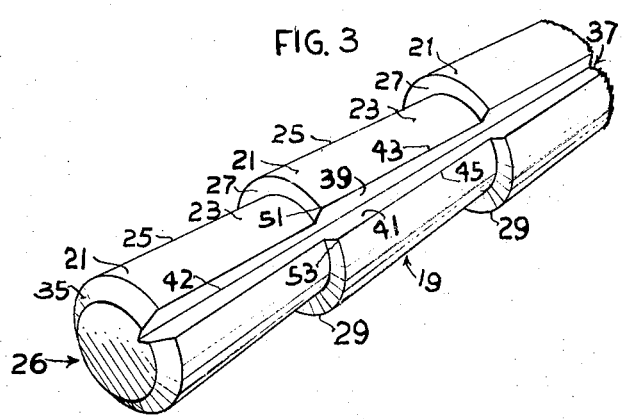
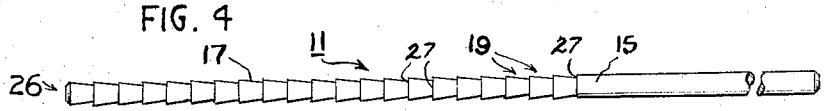
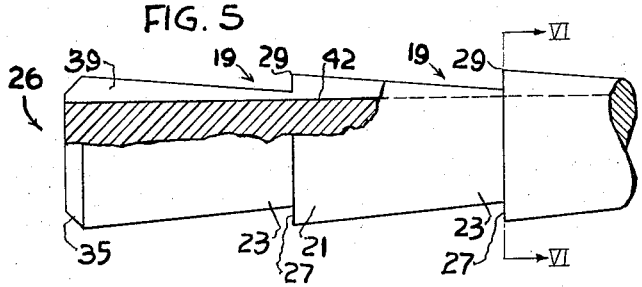
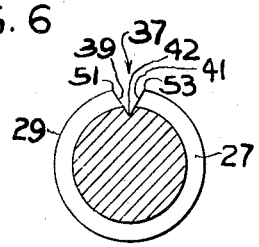
INVENTOR.
FRANK G. DONOFRIO
BY John R. Walker, III
Attorney United States Patent Office 3,217,476
Patented Nov. 16, 1965

3,217,476
COTTON PICKING SPINDLE
Frank G. Donofrio, 1540 Channel Ave., P.O. Box 6003, Memphis, Tenn.
Continuation of application Ser. No. 207,491, July 5, 1962. This application Jan. 21, 1965, Ser. No. 428,610
9 Claims. (Cl. 56—50)

This is a continuation of my copending application, Serial No. 207,491, filed July 5, 1962, now abandoned. This invention relates generally to cotton picking machines having rotating spindles. It is particularly concerned with rotating spindle pickers wherein the spindles move in an oval path and the cotton is removed from the spindles by a stripper. Still more particularly, this invention concerns an improved spindle for use in machines of the above type.

Cotton pickers in which the spindles move in an oval path are geenrally referred to as Rust type pickers and employ a stationary stripper and rod-like spindles; that is, these three factors are generally found in, and are common to, machines of this type.

The mechanical structure and operation of the Rust type machine is generally known, though for purposes of clarity of the present specification it seems appropriate to state briefly certain characteristics of this type machine and particularly those characteristics that relate directly to the spindle design of this invention.

In the Rust type machine, the picking unit, that is, the cotton gathering mechanism, is conveyed along a row of cotton and has many horizontal spindles in an oval path on one side of the row and a cotton plant-crowding device on the other side of the row. Thus, all the spindle driving means are on one side of the row and a stationary plant-crowder is on the opposite side. Along the oval path which the spindles travel, there is a picking side and a stripping side, with the cotton being wound around the spindles on the picking side and removed from the spindles on the stripping side. As the spindles travel in the continuous oval path, they rotate only while passing through the cotton on the picking side and do not rotate while the cotton is being removed on the stripping side.

Each spindle has a driving portion at one end and a picking portion at the opposite end. The driving portion is inwardly disposed relative to the oval spindle path, with the picking portion disposed outwardly therefrom. The speed at which the spindles travel along the oval path is the same as the speed at which the picking unit is conveyed along the row. As the picking unit is conveyed forward, the spindles along the picking side of the oval travel rearward; thus, the synchronized speeds in opposite directions cancel each other and cause the spindles to rotate in the cotton plant without an adverse forward or rearward stripping action.

The rotating spindles enter and extend laterally through the cotton plant adjacent the forward axis of the oval spindle path and, at the same instant, the stationary crowder plate along the opposite side of the row laterally compresses the plant into the spindles to assure complete plant penetration by the spindles. Subsequently, the cotton-laden spindles leave the row, travel around the rearward axis of the oval spindle path, and, entering the stripping side of the oval, pass through the stripper and around the front axis of the oval to continue on in another cotton picking cycle.

The cotton removing stripper employed in the Rust type machine is like a large stationary comb, and has horizontally disposed and vertically spaced teeth or shoes whereby the wrapped cotton is stripped from the spindles as they are pulled through the spaces between the stripper teeth.

A desirable characteristic in a cotton picking spindle is that it should be appropriately aggressive or that it should have the correct degree of aggressiveness. Aggressiveness in a cotton picking spindle refers to the degree of readiness with which a spindle catches and holds the cotton or foreign matter that it contacts. Spindles vary in aggressiveness from those having a smooth, less aggressive surface, to others having more aggressive sharp teeth or other such surface projections. A suitably aggressive spindle is one that will effectively engage the cotton and yet not have a harsh spindle action that would otherwise tear or damage the cotton fibers and pick an undue amount of trash. On the other hand, if a spindle is not aggressive enough, it will leave unpicked cotton on the row or in the field.

A further important factor to consider relative to spindle aggressiveness is the ease with which the cotton can be removed from the spindle as it passes through the spindle stripper. If the cotton is hard to strip from the spindle, it will cause an excessive strain on the stripper and the spindle driving mechanism. Additionally, the barbs, teeth and the like, often common to aggressive spindles, will rapidly wear the strippers, consequently widening the space therebetween and adversely affecting the spindle stripping faculty of the stripper.

Field conditions of cotton are varied and the kind of cotton, the fluffiness, and the amount of moisture present in the cotton determine to a large extent how readily it may be harvested. Thus, a cotton picking spindle should effectively pick cotton in various field conditions.

Previously devised spindles for use in the Rust type picker are generally those having a longitudinal knurl or recessed tooth construction. These spindles are reasonably effective when they are new and sharp; however, in a relatively short time, they become dull and worn, and consequently do not pick as effectively. Also, some spindle designs, particularly those having teeth or barbs, are relatively costly for they require several machining operations to manufacture.

This invention presents a cotton picking spindle of improved design and one of its objects is to provide a cotton picking spindle that will effectively engage the cotton in various field conditions.

A further object is to provide a cotton picking spindle whereby the engaged cotton wound around the spindle can be efficiently disengaged by the stripper.

A further object is to provide a cotton picking spindle having a self-sharpening characteristic, thereby enabling the initial spindle effectiveness to be sustained.

A further object is to provide a cotton picking spindle of relatively simple design that is easy to manufacture and, as such, can be made and marketed at a lower cost.

A further object is to provide a cotton picking spindle of such design as to be non-directional; that is, it can be actually driven in either clockwise or counterclockwise directions with equal effectiveness.

The means by which the foregoing and other objects of the present invention are accomplished and the manner of their accomplishment will be readily understood from the following specification upon reference to the accompanying drawings, in which:

FIG. 1 is an enlarged sectional view of a portion of the spindle stripper taken as on the line I—I of FIG. 2 and showing the spindle of the present invention in cooperation therewith to strip the cotton from the spindle.

FIG. 2 is a diagrammatic perspective view of a portion of the spindle stripper illustrating the directional movement of the spindles through the stripper teeth.

FIG. 3 is an end perspective view, much enlarged, of a portion of the spindle of the present invention as viewed from the picking end of the spindle.

FIG. 4 is a longitudinal view of the spindle on a reduced scale.

FIG. 5 is a greatly enlarged longitudinal view of the same portion of the spindle shown in FIG. 3, and with a portion being broken away for purposes of clarity.

FIG. 6 is a cross-sectional view taken as on the line VI—VI of FIG. 5.

Referring now to the drawings in which the various parts are indicated by numerals, the picking spindle 11 of the present invention is manufactured preferably of a good grade of steel rod or wire material properly heat-treated to have long-wearing qualities and a high degree of resiliency and ductility to thus be durable. The mounting and driving portion 15 is at one end of spindle 11, and is substantially the diameter of the raw stock and would require no further finishing. The actual means of driving spindle 11 is not shown, since it is familiar to those skilled in the art, and it will be understood that the spindle is moved along in an oval path and rotatably driven about its longitudinal axis, in the same manner as other Rust type pickers heretofore described, as for example, in the manner disclosed in Patent No. 2,943,431. The picking portion 17 of spindle 11 is adjacent the opposite end of the spindle from mounting and driving portion 15 and is comparatively easy to manufacture and requires a minimum number of shop operations. The process or means of manufacture are many and varied, and no attempt will be made to describe the operation, except to note that the particular simplified design of the spindle of the present invention facilitates economical mass production.

Cotton picking portion 17 comprises a plurality of frusto-conically-shaped segments 19. Each of the segments 19 has a larger base end 21 and an opposite smaller end 23, and has a lateral surface 25 which tapers from base end 21 to small end 23. Segments 19 are preferably of substantially the same size and are integrally joined in end-to-end relationship. Thus, each of the segments 19, except the innermost one adjacent driving portion 15, has its smaller end 23 integrally joined to the base end 21 of the next inwardly adjacent segment to establish a plurality of annular shoulders 27 spaced along the cotton picking portion 17 of the spindle. The above mentioned innermost segment 19 preferably establishes a similar shoulder 27 with the driving portion 15. In other words, the segments 19 are arranged so that the smaller ends 23 thereof are nearest the driving portion 15 and the base ends 21 thereof are nearest the distal end 26 of the spindle. Stated another way, each of the segments are tapered inwardly towards the driving portion 15.

Segments 19 are co-axially aligned, with the axes of the segments lying along the longitudinal axis of the spindle 11, so that shoulders 27 are substantially perpendicular to the longitudinl axis of the spindle. It will be understood that in each of segments 19 at the juncture of shoulder 27 with lateral surface 25 a sharp circular peripheral edge 29 of the shoulder 27 is formed. Thus, a plurality of sharpened peripheral edges 29 are provided on spindle 11 in spaced relationship along the length of cotton picking portion 17. It will be understood that the sharpness of the peripheral edges 29 will depend upon the taper of lateral surfaces 25. In other words, the more the taper, the sharper the edge. Each of the segments 19 can be thought of as flaring outwardly from adjacent the smaller end 23 thereof towards the distal end 26 of the spindle, with each of the segments terminating at its largest diameter in a sharpened peripheral edge 29. In addition, it should be noted that the outermost segment 19, that is, the one adjacent end 26, is preferably chamfered as at 35.

Extending longitudinally through picking portion 17 of spindle 11 is a groove 37. As best seen in FIGS. 3, 5, and 6, sides 39, 41 of groove 37 are parallel with the spindle axis and intersect along a line to establish the bottom 42 of the groove. The longitudinal intersection of side 39 with the tapered surface 25 of each frusto-conical segment 19 forms an edge 43 and, likewise, side 41 intersecting with the surface 25 forms a corresponding edge 45. Referring now to FIG. 3, it will be noted that the edges 43, 45 are diagonal relative to the spindle axis, and that they diverge from the small end 23 to the base end 21 of each segment. The intersection of side 39, shoulder 27, and surface 25 of each segment 19 forms the points 51. Likewise, side 41, shoulder 27 and surface 25 of each segment 19 intersect to form corresponding points Although spindle 11 has been described and illustrated having the groove 37, it is probable that in certain applications wherein the spindles are of small diameter it would be advantageous to dispense with the groove and employ only segments 19 with the sharpened edges 29 to engage the cotton fiber. In larger diameter spindle applications, however, groove 37 serves an important function, since the larger the diameter of the spindle the less aggressive it is. Thus, edges 43, 45 and points 51, 53 in the larger spindle applications initiate the wrapping of the cotton around the spindle, or, in other words, increase the aggressive action of the spindle.

The sharpness of peripheral edges 29 is also a factor in determining the aggressiveness of the spindle; the sharper the edge 29, the more readily does the spindle engage the cotton fiber. Furthermore, the spindle design is such that the peripheral edges 29 are completely around the spindle and are spaced along the cotton picking portion thereof, thereby improving considerably the effectiveness of the spindle.

When the spindles 11 are pulled between the stripper teeth or shoes, as illustrated as at 55 in FIGS. 1 and 2, there is a tendency to whet or sharpen the peripheral edges 29 of the spindles. In the co-acting functions of the spindles and stripper, as the cotton, which is indicated in general as C, is removed, there is a slight metal to metal contact of the edges 29 and the stripper teeth 55. The direction of spindle travel, when the spindles are pulled through the striper as indicated by the arrow designated by numeral 59 in FIGS. 1 and 2, is always away from the shoulders 27. Thus, as the spindles are pulled through the stripper, there is a tendency to keep edges 29 in a sharpened condition. The effective cotton-engaging faculty of the spindles is thereby sustained for a comparatively long peirod of time.

The conically-shaped design of segments 19, in addition to providing improved cotton-engaging and self-sharpening characteristics, also enables the cotton to be easily stripped from the spindles. Unlike previously designed spindles having barbs or the like which hinder efficient stripping action, the present invention provides a spindle without such hinderances whereby the cotton can be disengaged from the spindle efficiently. This can be visualized if it is considered that with relative movement of spindle 11 to the right, as viewed in FIG. 1, with the cotton C remaining stationary, there is substantially no resistance to this movement by the segments 19, whereas movement of the spindle in the opposite direction would cause the shoulders 27 and edges 29 to grab the cotton.

From the foregoing specification, it is readily discernable that the present invention provides an effective spindle whereby a minimum amount of cotton is left unpicked in the field and the picked cotton is of a good grade.

Although the invention has been described and illustrated with respect to a preferred embodiment thereof,

I claim:

1. A rod-like cotton picking spindle of the type adapted to be rotated about its longitudinal axis, said spindle comprising an elongated integral solid structured exposed and cotton engaging picking portion having a substantially small diameter and including a plurality of sharpened cotton engaging peripheral edges along the length of said picking portion, said sharpened peripheral edges being an integral part of said picking portion, said edges being unobstructed and respectively lying in imaginary parallel planes extending substantially perpendicular to the longitudinal axis of said spindle, the distance between adjacent edges of said plurality of edges being greater than the diameter of each edge of said plurality of edges.

2. A rod-like cotton picking spindle of the type adapted to be rotated about its longitudinal axis, said spindle comprising an elongated integral solid structured exposed and cotton engaging picking portion having a substantially small diameter and including a plurality of individual sharpened peripheral edges spaced along the length of said picking portion, said sharpened peripheral edges being an integral part of said picking portion, and pairs of edges circumferentially spaced relative to said cotton picking portion and respectively intersecting said peripheral edges to establish pairs of points, said sharpened peripheral edges respectively lying in parallel planes extending substantially perpendicular to the longitudinal axis of said spindle, the distance between adjacent edges of said plurality of edges being greater than the diameter of each edge of said plurality of edges.

3. A rod-like cotton picking spindle of the type adapted to be rotated about its longitudinal axis, said spindle comprising an elongated integral solid structured portion having a substantially small diameter and frusto-conical segments each having a base end and an opposite smaller end and having a lateral surface, said segments being integrally joined in end-to-end relationship to provide a plurality of annular shoulders spaced along said picking portion, each of said shoulders including a sharpened cotton engaging peripheral edge, said edge being unobstructed and lying in an imaginary plane extending substantially perpendicular to the longitudinal axis of said spindle, the distance between adjacent edges of said plurality of edges of said plurality of shoulders being greater than each base end diameter respectively of said plurality of frusto-conical segments.

4. The spindle of claim 3 in which a groove is provided in said spindle along the length of said picking portion including a pair of intersecting sides defining said groove, and said sides providing a pair of edges at the juncture of said sides with said lateral surface of each of said segments.

5. A rod-like cotton picking spindle of the type adapted to be rotated about its longitudinal axis, said spindle comprising an elongated picking portion adjacent one end and an elongated integrally attached driving portion adjacent the opposite end, said picking portion including a plurality of frusto-conical segments, each of said segments having a base end and an opposite smaller end, each of said segments having a lateral surface extending from said smaller end to said base end, said segments being integrally joined in end-to-end relationship with said smaller end of each of said segments being nearest said driving portion, adjacent ones of said segments having said smaller ends joined to said larger ends to provide a plurality of annular shoulders spaced along said picking portion, said annular shoulders respectively providing with said lateral surfaces at the junctures therewith a plurality of individual sharpened circular and unobstructed peripheral edges spaced along said picking portion and perpendicularly disposed relative to the longitudinal axis of said spindle, and said picking portion being provided with a groove along the length thereof.

6. A rod-like cotton picking spindle of the type adapted to be rotated about its longitudinal axis, said spindle comprising an elongated picking portion adjacent one end and an elongated integrally attached driving portion adjacent the opposite end, said picking portion including a plurality of substantially equal sized frusto-conical segments, each of said segments having a base end and an opposite smaller end, each of said segments having a lateral surface extending from said smaller end to said base end, said segments being integrally joined in end-to-end relationship with said smaller end of each of said segments being nearest said driving portion, adjacent ones of said segments having said smaller ends joined to said larger ends to provide a plurality of annular shoulders spaced along said picking portion, said segments being co-axially aligned with one another with the axes of said segments lying along the longitudinal axis of said spindle whereby said annular shoulders are substantially perpendicular to the longitudinal axis of said spindle, said annular shoulders respectively providing with said lateral surfaces at the junctures therewith a plurality of individual sharpened and unobstructed circular peripheral edges spaced along said picking portion, said picking portion being provided with a groove along the length thereof including a pair of intersecting sides defining said groove, said sides respectively establishing with said lateral surfaces pairs of edges diverging from adjacent said smaller ends of said segments to said base ends thereof, and said sides respectively establishing with said shoulders and said lateral surfaces at the junctures thereof pairs of points.

7. In a cotton picker of the Rust type, an elongated horizontal spindle having a longitudinal axis and being rotatably driven about said longitudinal axis, said spindle comprising an elongated exposed and cotton engaging picking portion including a plurality of individual circular sharpened peripheral edges along the length of said picking portion, each of said peripheral edges lying in a substantially uniform arc and being an integral part of said picking portion, and said edges lying in vertical planes perpendicular to said axis, the distance between adjacent edges of said plurality of edges being greater than the diameter of each edge of said plurality of edges.

8. In a cotton picker of the Rust type, a rod-like horizontal spindle having a longitudinal axis and being rotatably driven about said longitudinal axis, said spindle comprising an elongated picking portion adjacent one end and an elongated integrally attached driving portion adjacent the opposite end, said picking portion including a plurality of substantially equal-size frusto-conical segments, each of said segments having a base end and an opposite smaller end, each of said segments having a lateral surface extending from said smaller end to said base end, said segments being integrally joined in end-to-end relationship with said smaller end of each of said segments being nearest said driving portion, adjacent ones of said segments having said smaller ends joined to said larger ends to provide a plurality of annular shoulders spaced along said picking portion, said segments being co-axially aligned with one another with the axes of said segments lying along the longitudinal axis of said spindle whereby said annular shoulders are substantially perpendicular to the longitudinal axis of said spindle, said annular shoulders respectively providing with said lateral surfaces at the junctures thereof a plurality of individual sharpened and unobstructed circular peripheral edges spaced along said picking portion.

9. The cotton picking spindle of claim 8 which includes a groove extending longitudinally in said spindle and with said groove providing respectively a plurality of pairs of points at the intersection of said groove with said plurality of circular peripheral edges spaced along said picking portion.

(References on following page)

References Cited by the Examiner

UNITED STATES PATENTS

| | | | |
|---|---|---|---|
| 367,075 | 7/1887 | Todd | 56—50 |
| 1,059,478 | 3/1913 | Lispenard | 56—50 |
| 1,859,144 | 5/1932 | Johnston | 56—50 |
| 2,716,320 | 8/1955 | Wunderlich | 56—50 |
| 2,832,186 | 3/1958 | LaRue | 56—50 |
| 3,096,607 | 7/1963 | Scholtes | 56—50 |

ABRAHAM G. STONE, *Primary Examiner.*

RUSSELL R. KINSEY, *Examiner.*